W. JACOBUS.
LOCK NUT.
APPLICATION FILED OCT. 26, 1909.

983,497.

Patented Feb. 7, 1911.

Witnesses

Inventor
William Jacobus
By his Attorney

UNITED STATES PATENT OFFICE.

WILLIAM JACOBUS, OF PATERSON, NEW JERSEY.

LOCK-NUT.

983,497.

Specification of Letters Patent.

Patented Feb. 7, 1911.

Application filed October 26, 1909. Serial No. 524,677.

*To all whom it may concern:*

Be it known that I, WILLIAM JACOBUS, citizen of the United States, and a resident of Paterson, in the county of Passaic and State of New Jersey, have invented certain new and useful Improvements in Lock-Nuts, of which the following is a specification.

My invention relates to lock-nuts and my object is to provide a lock-nut having a locking member which may be held in the nut when disconnected from the bolt and means whereby the lock may be forced into engagement with the bolt and held in locked relation therewith.

A further object of my invention is to form the lock so as to engage the bolt at the top and bottom of the thread of the bolt simultaneously and locate the lock in the nut at a point where the nut may retain its greatest degree of strength.

Figure 1:
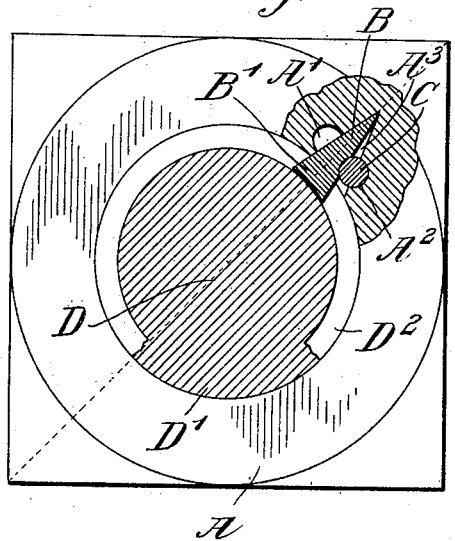
Figure 2:
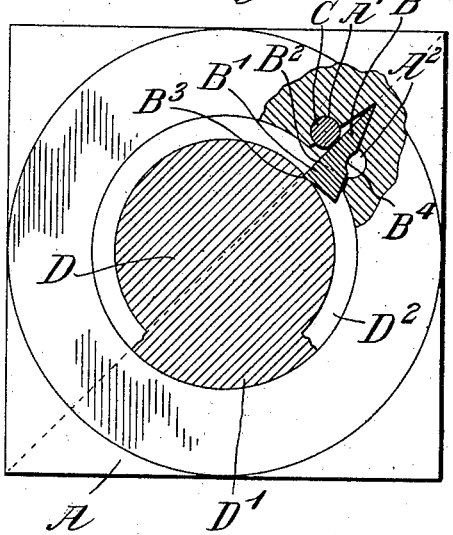
Figure 3:
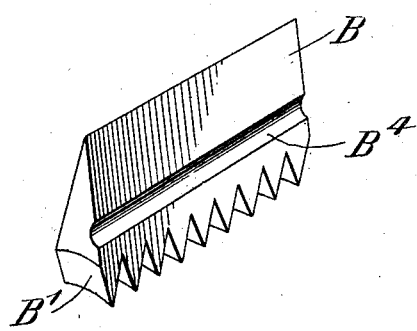

Referring to the drawings which form a part of this specification, Figure 1, indicates a lock-nut embodying my invention, said nut being shown partly in section, and the bolt shown in cross section; the lock being disclosed in unlocked relation to the bolt. Fig. 2, is a similar view to that of Fig. 1, except that the lock is shown in locked relation to the bolt. Fig. 3 is a perspective view of the lock of the nut.

A, indicates the nut, which is shown in this case as square in form, but it may be hexagonal or octagonal if desired.

B, indicates the locking member, hereinafter referred to as the lock; C, indicates the pin, by means of which the lock is held in the nut and also the means by which the lock is held in locked engagement with the bolt D.

D′ indicates the thread on the bolt, shown in section, and D² indicates the space or groove of the thread in which the thread of the nut fits.

The lock B preferably extends the width of the nut but not necessarily so. The pin C, is preferably made as long as the nut is wide. The depth of the thread B′ is equal to that of the thread of the bolt, and its threaded end is curved to closely conform to the thread of the bolt. The lock is triangular in shape and is located in a V shaped recess A³ which is located with the apex of the V toward one of the corners of the nut and the curved base portion of the lock located one half on each side of a line drawn through the nut from one corner to another diagonally through the nut, when the lock is in its unlocked position as shown in Fig. 1. The recess in the nut is wider than the lock to permit the lock to rock on its apex into locked engagement with the bolt as illustrated in Fig. 2.

It will be seen that in Fig. 2, the lock has engaged the bolt and has bit into the bolt on the top of the bolt thread and bottom also as indicated at B² and B³, and readily understood by those skilled in this art.

In each side of the recess and extending the width of the nut, is a semi-circular groove indicated by A′ and A² respectively, and in one side of the lock is also formed a recess B⁴ which is shallow, and is located so as to register with the groove A².

In making the nut, the recess A³ is preferably formed in the pressing operation. The lock B may be drop forged or otherwise formed, and the lock then inserted in the nut and the pin driven in the groove to hold the lock in the position shown in Fig. 1, in which position the nut and lock are threaded simultaneously, thus insuring perfect registration of the threads in the nut, lock and bolt, when assembled. The bolt may be freely rotated in the nut in either direction when in the position shown in Fig. 1, but when the pin C is withdrawn and the nut rotated to the left hand side, the lock will rock at its apex toward the position shown in Fig. 2, due to friction between the threads of the lock and bolt, and by then driving the pin into the groove A′, the lock will be forced to the right thus causing its threads to bite into and interlock with the threads of the bolt and effectually preventing its unlocking. It must be observed that the groove A′ is slightly greater in depth than groove A², to permit the pin to seat in the groove A′ against the face of the lock, as it is best not to place a groove in both sides of the lock since it would weaken it at this point.

It will be observed that when the lock is in locked relation with the bolt, that its locking side is practically in line with a line drawn through the bolt diagonally from corner to corner, at which point the greatest locking effect is attained and that by placing the apex of the lock toward a corner of the bolt, the greatest strength is attained that is possible under the general conditions of construction.

Having thus described my invention, what

I claim as new and desire to secure by Letters Patent is,

1. A lock nut comprising, a nut having a recess therein, and a groove in each side of said recess; a lock in said recess; and means located in one of said grooves for holding the lock in locked engagement with a bolt, to prevent said nut from moving in either direction thereon.

2. A lock nut comprising a nut having a recess which extends the width of same and is V shape in form and having a groove in each side of said recess; a V shaped lock located therein and provided with a groove which extends longitudinally thereof; and a pin adapted to coöperate with said nut and lock to enter either of said grooves and hold said lock positively either in locked or unlocked relation to a bolt.

3. A lock nut comprising a nut having a recess and a groove in said nut on each side of said recess; a lock in said recess having a groove in one side thereof located opposite one of the grooves in said nut; and a pin adapted to fit into one of said grooves in the nut and abut said lock to hold it in the locked position on a bolt, to prevent said nut from moving in either direction on said bolt.

4. A lock nut comprising a nut having a recess and a groove extending longitudinally thereof; a lock adapted to rock in said recess; a pin adapted to fit into said groove and abut said lock to hold it in locked position on a bolt.

Signed at New York in the county of New York and State of New York this sixteenth day of July A. D. 1909.

WILLIAM JACOBUS.

Witnesses:
 FRANK M. ASHLEY,
 HARRY A. WILKES.